(12) United States Patent
Kwon et al.

(10) Patent No.: US 8,563,172 B2
(45) Date of Patent: Oct. 22, 2013

(54) ANODE COMPOSITION FOR LITHIUM SECONDARY BATTERY AND LITHIUM SECONDARY BATTERY USING THE SAME

(75) Inventors: Yo-Han Kwon, Daejeon (KR); Byung-Hun Oh, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/278,371

(22) Filed: Oct. 21, 2011

(65) Prior Publication Data

US 2012/0040244 A1 Feb. 16, 2012

Related U.S. Application Data

(63) Continuation of application No. PCT/KR2010/008152, filed on Nov. 18, 2010.

(30) Foreign Application Priority Data

Nov. 18, 2009 (KR) ........................ 10-2009-0111341

(51) Int. Cl.
  *H01M 4/13* (2010.01)
  *H01B 1/18* (2006.01)
(52) U.S. Cl.
  USPC ........ 429/212; 429/218.1; 429/232; 252/507; 252/518.1; 252/519.13; 252/520.1; 252/521.3
(58) Field of Classification Search
  USPC ................... 429/212, 218.1; 252/507, 518.1, 252/519.13, 520.1, 521.3
  See application file for complete search history.

(56) References Cited

U.S. PATENT DOCUMENTS

| 2002/0119373 A1* | 8/2002 | Gao et al. .................... 429/218.1 |
| 2005/0153205 A1* | 7/2005 | Hisashi et al. ................ 429/232 |
| 2008/0038635 A1 | 2/2008 | Sheem et al. |
| 2008/0090149 A1 | 4/2008 | Sano et al. |

FOREIGN PATENT DOCUMENTS

| EP | 1873846 A1 | 1/2008 |
| JP | 2008-117761 A | 5/2008 |
| KR | 1999-0085207 | 12/1999 |
| KR | 20060095367 A | 8/2006 |
| KR | 10-0796687 | 1/2008 |
| KR | 2008-0009269 A | 1/2008 |

OTHER PUBLICATIONS

International Search Report, PCT/KR2010/008152, dated Jun. 30, 2011.

* cited by examiner

*Primary Examiner* — Patrick Ryan
*Assistant Examiner* — Ladan Mohaddes
(74) *Attorney, Agent, or Firm* — Lerner, David, Littenberg, Krumholz & Mentlik, LLP

(57) ABSTRACT

An anode composition for a lithium secondary battery includes an anode active material, a binder, and a conductive material. The active material includes a plurality of anode active material particles, each of which includes a core made of metal or metalloid allowing alloying or dealloying with lithium, or a compound containing the metal or metalloid; and a shell formed at an outer portion of the core and having Ketjen black. The conductive material includes carbon nano fiber. The anode composition uses a metal-based anode active material that may controls the volume expansion, and also uses conductive material with excellent dispersion so that the life characteristic of the battery may be improved.

9 Claims, 1 Drawing Sheet

(a)  (b)

ANODE COMPOSITION FOR LITHIUM SECONDARY BATTERY AND LITHIUM SECONDARY BATTERY USING THE SAME

CROSS REFERENCE TO RELATED APPLICATIONS

The present application is a continuation of International Application No. PCT/KR2010/008152, filed Nov. 18, 2010, published in Korean, which claims priority from Korean Patent Application No. 10-2009-0111341, filed Nov. 18, 2009, all of which are incorporated herein by reference.

BACKGROUND OF THE INVENTION

1. Field of the Invention

The present invention relates to an anode composition for a lithium secondary battery and a lithium secondary battery using the same. More particularly, the present invention relates to an anode composition for a lithium secondary battery that includes a specific conductive material and an anode active material with a shell containing a specific material to ensure an improved life characteristic, and a lithium secondary battery having the same.

2. Description of the Related Art

Various kinds of electrolytes are used for the recently widely used electrochemical devices, lithium secondary batteries, electrolyte condensers, electric double-layered capacitors, and electrochromic display devices, as well as the variously studied dye-sensitized solar cells for future commercialization. The importance of electrolytes is increasing day by day.

In particular, lithium secondary batteries are attracting the most attention for its high energy density and long cycle life. Generally, a lithium secondary battery includes an anode made of carbon material or lithium metal alloy, a cathode made of lithium metal oxide, and electrolyte made by dissolving a lithium salt in an organic solvent.

Initially, lithium metal was used for the anode of a lithium secondary battery. However, due to lithium having a problem of low reversibility and low safety, generally carbon materials are now being used as an anode active material of a lithium secondary battery. The carbon material compared with lithium has low capacity but is advantageous in that it has excellent reversibility and low price.

However, as the use of lithium secondary batteries are increasing, so does the demand for high-capacity lithium secondary batteries. Accordingly, there is a demand for a high-capacity anode active material that may substitute the carbon material having low capacity. In order to meet the demand, attempts were made to use metals, for example Si and Sn, that have a higher charge/discharge capacity than the carbonaceous materials and that allow electrochemical alloying with lithium.

However, such metal-based anode active materials have serious changes in volume, accompanied with charging/discharging of lithium, resulting in the metal-based anode active materials to crack and pulverize. Thus, when charging/discharging cycles are repeated, the metal-based anode active material shows a sudden deterioration of capacity and a shorter cycle life.

In order to solve the above problem, attempts were made to use compounds of metals such as Si and Sn, in other words their oxides or alloys, as an anode active material. However, if the oxide or alloy of metal is used, problems like the pulverization of anode active material and the continuous side reactions with electrolyte are still not solved, even though the life characteristic and the volume expansion prevention are improved in comparison to the case using only metal as an anode active material. Thus, the above method is not a fundamental solution for the above problems.

A new attempt has been made to improve the life characteristic by coating a metal-based anode active material with carbon by means of chemical vapor deposition or thermal treatment such as carbonization. However, these methods are accompanied with high temperature and in the case of the metal-based anode active material, there is a possibility that the structural features or electrochemical properties of the original material may change in accordance with the temperature at which the thermal treatment is performed.

In addition, the degree of dispersion of the conductive material and the anode active material are a great contribution to improving the performance of a battery, when an anode composition is made. Commonly, the conductive material uses spherical conductive carbon fine particles having an average diameter of 30 to 100 nm and a specific surface area of about 1,400 $m^2/g$, but due to its small size and its great specific surface area, this conductive material has difficulty dispersing.

SUMMARY OF THE INVENTION

Therefore, it is an object of the present invention to provide an anode active material for a lithium secondary battery, which has an excellent cycle life characteristic by controlling the expansion of volume and preventing side reaction with electrolyte.

Another object of the present invention is to provide an improved anode composition with an improved cycle life characteristic by improving the dispersion of a conductive material in the anode composition.

In order to achieve the objects, the present invention provides an anode composition for a lithium secondary battery, which includes an anode active material, a binder, and a conductive material, wherein the anode active material includes a plurality of anode active material particles, each of which includes a core made of metal or metalloid allowing alloying or dealloying with lithium, or a compound containing the metal or metalloid; and a shell formed at an outer portion of the core and having Ketjen black, and wherein the conductive material includes carbon nano fiber.

The metal or metalloid allowing alloying or dealloying with lithium, used for the core of the anode active material particle, may be any one selected from the group consisting of Si, Sn, Al, Sb, Bi, As, Ge, and Pb, or their mixtures, or their alloys.

The shell may be formed by applying a mechanical stress to a mixture of the material for the core and the material for the shell, and the content of Ketjen black in the shell is preferably 0.1 to 10 parts by weight, based in 100 parts by weight of the entire anode active material.

The carbon nano fiber may be formed by vapor deposition, and the content of the carbon nano fiber is preferably 0.1 to 10 parts by weight, based on 100 parts by weight of the entire anode composition.

The anode composition of the present invention may be applied to at least one surface of a current collector and then used to make an anode of a lithium secondary battery or to make a lithium secondary battery.

EFFECTS OF THE INVENTION

The anode composition according to the present invention coats the surface of a metal-based anode active material with a coating agent containing Ketjen black at a lowest temperature possible to minimize the change of structural characteristics of the metal-based active material and the change of electrochemical characteristics, which was issued at high temperature, and gives high conductivity between anode active materials by means of the above surface treatment. Thus, the present invention may improve the life characteristics of the metal-based anode active material.

In addition, a conductive material with high dispersion is used for the anode composition, so that the problems caused by irregular distribution of the conductive material, such as the deterioration of rate characteristic of a battery, a voltage drop, and fast lithium extraction in an electrode, may be solved.

BRIEF DESCRIPTION OF THE DRAWINGS

Other aspects of the exemplary embodiments will become apparent from the following descriptions of the embodiments with reference to the accompanying drawings in which:

FIG. 1a is taken before the coating and FIG. 1b is taken after the coating.

DESCRIPTION OF THE PREFERRED EMBODIMENT

Figure 1:
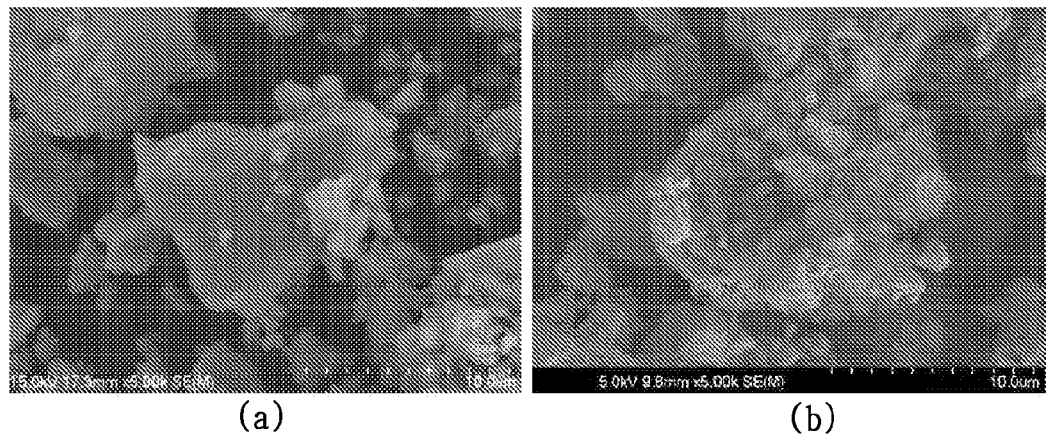
FIGS. 1a and 1b are SEM photographs taken for an anode active material according to example 1 of the present invention, where

Hereinafter, preferred embodiments of the present invention will be described in detail with reference to the drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

An anode composition for a lithium secondary battery according to the present invention includes an anode active material, a binder, and a conductive material, wherein the anode active material includes a plurality of anode active material particles, each of which includes a core made of metal or metalloid allowing alloying or dealloying with lithium, or a compound containing the metal or metalloid; and a shell formed at an outer portion of the core and having Ketjen black, and wherein the conductive material includes carbon nano fiber.

In the present invention, the metal or metalloid that allows alloying or dealloying with lithium shows higher charge/discharge capacity than carbon material, as a metal-based anode active material. However, this metal-based anode active material has serious changes in volume, accompanied with charging/discharging of lithium, leaving it to crack and pulverize. As a result, when charge/discharge cycles are repeated, the metal-based anode active material shows a sudden deterioration of capacity and a shorter cycle life.

Thus, the present invention solves this problem by providing an anode active material having a shell containing Ketjen black to the outer portion of the metal-based anode active material. The shell containing Ketjen according to the present invention controls the expansion of volume of the metal-based anode active material that is the core, so that the anode active material does not crack or pulverize even though the charge/discharge cycles are repeated.

In particular, the Ketjen block used in the shell in the present invention has a high electric conductive of about $10^3$ to $10^4$ S/cm, and thus the Ketjen black may improve the conductivity of the anode active material and further improve the life characteristic. Also, the shell according to present invention may control side reaction with electrolyte by preventing direct contact between the core of the metal-based anode active material and the electrolyte.

The content of the Ketjen black according to the present invention may be variously selected depending on the use of the battery. The content may be but not limited to for example 0.1 to 10 parts by weight, based on 100 parts by weight of the entire anode active material. If the content is less than 0.1 parts by weight, the coating work may be performed inappropriately. If the content is greater than 10 parts by weight, the Ketjen black may deteriorate the battery efficiency and capacity, resulting in the increase of electrode resistance and the reduction of battery life.

The metal-based anode active material used for the core in the present invention may use any metal or metalloid, which allows alloying or dealloying with lithium, or their compounds, which has a higher capacity in comparison to the carbon anode active material, with no special limitation. In detail, for example, the metal or metalloid allowing alloying or dealloying with lithium may be any one selected from the group consisting of Si, Sn, Al, Sb, Bi, As, Ge, and Pb, or their mixtures, or their alloys, and their compounds may be oxides of the metal or metalloid, complexes of the metal or metalloid, and so on.

The anode active material particle according to the present invention is preferably made at a relatively low temperature in order to prevent electrochemical characteristics of the metal-based anode active material from changing. For example, a mechanical stress may be applied to a mixture of the material for the core and the material for the shell so that the material for the shell may be attached to the core. As a more detailed method for applying a mechanical stress at a relatively low temperature, ball milling may be performed at a normal temperature (15 to 25° C.). The process for applying a mechanical stress like the above is preferably performed under the condition that the thermal energy generated during the process is minimized.

Selectively, the anode active material according to the present invention may be used in mixture with an anode active material that is commonly used in the prior art. For example carbon material may be mixed with the anode active material of the present invention, and the carbon material may be any of low-crystalline carbons and high-crystalline carbons. Representative examples of the low-crystalline carbon are soft carbon and hard carbon, and representative examples of the high-crystalline carbon are natural graphite, Kish graphite, pyrolytic carbon, mesophase pitch based carbon fiber, mesocarbon microbeads, mesophase pitches, and high-temperature baked carbons such as petroleum or coal tar pitch derived cokes.

In addition, the anode composition of the present invention may be made by mixing the anode active material with a binder and a conductive material.

The conductive material includes carbon nano fiber. Preferably, the conductive material may use carbon nano fiber made by vapor deposition. The carbon nano fiber made by vapor deposition has excellent dispersion in the anode composition, and the carbon nano fiber made ensures uniform performance of the entire anode, when used to make an anode.

In particular, the inventors of the present invention made the present invention based on the observation that a cycle life of the anode is greatly improved when the anode active material having Ketjen black shell and carbon nano fiber conductive material are used together.

The content of carbon nano fiber according to the present invention may be but not limited to 0.1 to 10 parts by weight, based on 100 parts by weight of the entire anode composition. If the content is less than 0.1 parts by weight, the conductive material may not ensure a sufficient effect. If the content is greater than 10 parts by weight, the excessive carbon nano fiber may reduce the efficiency and capacity of the electrode.

The anode composition according to the present invention may further include a binder, and for example, various kinds of binder polymers such as vinylidenefluoride-hexafluoropropylene copolymer (PVDF-co-HFP), polyvinylidenefluoride, polyacrylonitrile, and polymethylmethacrylate may be used solely or in combination.

The anode composition of the present invention may be applied to at least one surface of a current collector according to a general method commonly used in the art, and by using the same, it is possible to make a lithium secondary battery including a separator interposed between a cathode and an anode, and an electrolyte, commonly applied in the art.

In the present invention, the cathode active material is preferably a lithium-containing transition metal oxide, for example any one selected from the group consisting of $Li_xCoO_2(0.5<x<1.3)$, $Li_xNiO_2(0.5<x<1.3)$, $Li_xMnO_2(0.5<x<1.3)$, $Li_xMn_2O_4(0.5<x<1.3)$, $Li_x(Ni_aCo_bMn_c)O_2(0.5<x<1.3, 0<a<1, 0<b<1, 0<c<1, a+b+c=1)$, $Li_xNi_{1-y}Co_yO_2(0.5<x<1.3, 0<y<1)$, $Li_xCo_{1-y}Mn_yO_2(0.5<x<1.3, 0\leq y<1)$, $Li_xNi_{1-y}Mn_yO_2$ $(0.5<x<1.3, O\leq y<1)$, $Li_x(Ni_aCo_bMn_c)O_4$ $(0.5<x<1.3, 0<a<2, 0<b<2, 0<c<2, a+b+c=2)$, $Li_xMn_{2-z}Ni_zO_4(0.5<x<1.3, 0<z<2)$, $Li_xMn_{2-z}Co_zO_4(0.5<x<1.3, 0<z<2)$, $Li_xCoPO_4(0.5<x<1.3)$, and $Li_xFePO_4(0.5<x<1.3)$, or their mixtures. The lithium-containing transition metal oxide may be coated with metal such as Al or metal oxide. Also, sulfide, selenide and halide may be also used in addition to the lithium-containing transition metal oxide.

In the electrolyte used in the present invention, a lithium salt may use any one commonly used in the electrolyte for lithium secondary batteries, with no limitation. For example, the lithium may have any anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

In the electrolyte used in the present invention, an organic solvent included in the electrolyte may use any one commonly used in the electrolyte for lithium secondary batteries. Representative examples of the organic solvent are propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethylsulfoxide, acetonitrile, dimethoxyethane, diethoxyethane, divinylene carbonate, sulforane, γ-buryrolactone, propylene sulfite, and tetrahydrofuran, or their mixtures. In particular, among the above carbonate-based organic solvents, ethylene carbonate and propylene carbonate that are cyclic carbonate are high-viscosity organic solvents, which has high dielectric constant and thus easily dissociates lithium salts in the electrolyte. Also, if low-viscosity and low-dielectric linear carbonate such as dimethyl carbonate and diethyl carbonate is mixed at a suitable ratio with the above cyclic carbonate, an electrolyte with high electric conductivity may be made and used more preferably.

Selectively, the electrolyte stored according to the present invention may further include an additive such as an overcharge inhibitor, which is included in a common electrolyte.

In addition, the separator may use a common porous polymer film conventionally used as a separator, for example porous polymer films made of ethylene homopolymer, propylene homopolymer, ethylene/butene copolymer, ethylene/hexene copolymer, and ethylene/methacrylate copolymer, solely or in lamination. In other cases, a common porous non-woven fabric, for example a non-woven fabric made of high-melting glass fiber, polyethylene terephthalate fiber, and so on, may be used but not limited thereto.

A battery case used in the present invention may use any one commonly used in the art, and there is no special limitation on the appearance according to the use of the battery. For example, the battery case may have a cylindrical shape using a can, a rectangular shape, a pouch shape, or a coin shape.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Example 1 and Comparative Examples 1 to 4

Si—Sn—Al—Ti alloy (4 mass % of Si, 30 mass % of Sn, 21 mass % of Al, and 45 mass % of Ti), graphite, Ketjen black, conductive material, and binder were used to make an anode active material and an anode composition with the compositions shown in the following table 1.

In a case where Ketjen black (KB) was coated when making an anode active material, ball milling was performed at 200 rpm for 3 minutes.

FIGS. 1a and 1b are SEM photographs showing the anode active material made according to the example 1 of the present invention (FIG. 1a shows a photograph before coating, and FIG. 1b shows a photograph after coating).

TABLE 1

|  | Anode active material ((Si alloy:KB):graphite (weight ratio)) (weight %) | Conductive material (weight %) | Binder (PVdF) (weight %) |
|---|---|---|---|
| Example 1 | 95((49:1):50) | 1 (carbon nano fiber) | 4 |
| Comparative Example 1 | 96((48:2):50) | 0 | 4 |
| Comparative Example 2 | 94((50:0):50) | 2 (KB) | 4 |
| Comparative Example 3 | 94((50:0):50) | 2 (carbon nano fiber) | 4 |
| Comparative Example 4 | 95((49:1):50) | 1 (Denka black) | 4 |

Experimental Example

The anode compositions according to the example and the comparative examples were added to N-methylpyrrolidone to make slurry, which were then applied to a copper foil and dried at about 130° C. for 2 hours to make an anode. Then, a metal lithium foil was used as a cathode, and a polyethylene separator was interposed between the anode and the cathode to make an electrode assembly.

The electrode assembly was put into a battery case, and then an electrolyte obtained by adding 1M $LiPF_6$ to a nonaqueous solvent in which ethylene carbonate and diethyl carbonate were mixed at a volume ratio of 1:2 was injected into the electrode assembly to make a coin-type half battery.

1. Charge/Discharge Characteristics of Cells

The batteries made according to the example and the comparative examples were used for evaluating charge/discharge characteristics. The batteries were charged by a constant current with a current density of 0.5 C up to 5 mV and then kept at a constant voltage of 5 mV, and then the charging process ended if the current density reached 0.005 C. In the discharging process, the batteries were completely discharged with a current density of 0.5 C to 1V in a CC mode. The charging/discharging processes were repeated 50 times under the same conditions.

Figure 2:
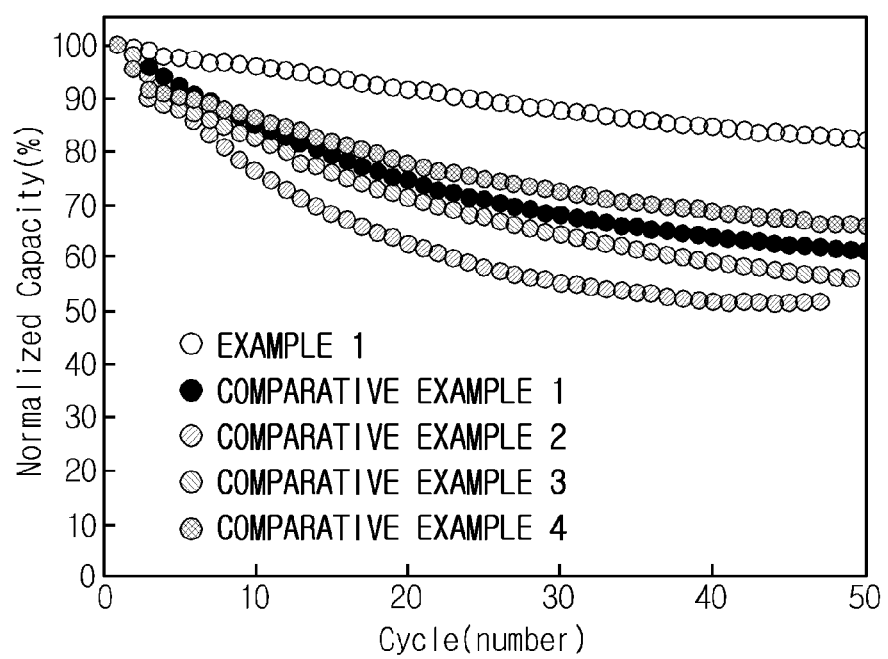
FIG. 2 is a graph showing test results of life characteristics according to example 1 and comparative examples 1 to 4.

FIG. 2 shows a cycle curve in comparison to a normalized discharge capacity with respect to the made coin-type batteries. As shown from FIG. 2, it could be found that the cycle life characteristic of the coin-type battery according to the battery 1 is greatly improved.

Comparing the example 1 with the comparative example 1, it is determined that the carbon nano fiber is better dispersed in the anode composition since the carbon nano fiber has better dispersion in comparison to the Ketjen black in spite of smaller electric conductivity, and thus the cycle life characteristic of the example 1 is improved.

In addition, the comparative example 2 shows a cycle life characteristic greatly lower in comparison to the example 1 and the comparative example 1, in which the Ketjen black is applied. From this, it could be understood that the applied Ketjen black controls side reaction between the metal-based anode active material and the electrolyte, and also the Ketjen black with high electric conductivity improves conductivity of the anode active material, so that the cycle life characteristic is improved.

The comparative example 3 in which only carbon nano fiber is used as the conductive material without applying Ketjen black also shows a cycle life characteristic that is very low in comparison to the example 1 but similar to the case of the comparative example 1. From the comparative examples 1 and 3, it could be understood that there is a remarkable synergetic effect if the Ketjen black is applied and the carbon nano fiber is used as the conductive material.

In addition, the comparative example 4 in which an anode active material coated with Ketjen black is used but Denka black is used as the conductive material instead of carbon nano fiber shows a somewhat improved effect in comparison to the comparative example 3 in which the conductive material is not used, but its cycle characteristic is greatly low in comparison to the example 1. Thus, it could be also found that there is a remarkable synergetic effect when the Ketjen black coating and the carbon nano fiber serving as the conductive material are used together.

What is claimed is:

1. An anode composition for a lithium secondary battery, said battery further comprising an electrolyte, said anode composition comprising an anode active material, a binder, and a conductive material:
   (A) wherein the anode active material comprises a plurality of anode active material particles, each of which comprises:
      (1) a core of metal or metalloid, or a compound comprising the metal or metalloid, allowing alloying or dealloying with lithium; and
      (2) a shell formed at a surface of the core, said shell consisting of Ketjen black; and
   (B) wherein the conductive material comprises carbon nano fiber dispersed in the anode composition; and
   (C) wherein the metal or metalloid allowing alloying or dealloying with lithium, used for the core of the anode active material particle, is any one selected from the group consisting of Si, Sn, Al, Sb, Bi, As, Ge, Pb, their mixtures, and their alloys.

2. The anode composition for a lithium secondary battery according to claim 1,
   wherein the content of the Ketjen black in the shell of the anode active material particle is 0.1 to 10 parts by weight, based in 100 parts by weight of the entire anode active material.

3. The anode composition for a lithium secondary battery according to claim 1,
   wherein the shell is formed by applying a mechanical stress to a mixture of a material for the core and a material for the shell.

4. The anode composition for a lithium secondary battery according to claim 1,
   wherein the anode active material further comprises a carbon anode active material.

5. The anode composition for a lithium secondary battery according to claim 1,
   wherein the carbon nano fiber is formed by vapor deposition.

6. The anode composition for a lithium secondary battery according to claim 1,
   wherein the content of the carbon nano fiber is 0.1 to 10 parts by weight, based on 100 parts by weight of the entire anode composition.

7. The anode composition for a lithium secondary battery according to claim 1,
   wherein the binder is any one selected from the group consisting of vinylidenefluoride-hexafluoropropylene copolymer, polyvinylidenefluoride, polyacrylonitrile, polymethylmethacrylate, and their mixtures.

8. An anode for a lithium secondary battery, which comprises a current collector and an anode composition applied to at least one surface of the current collector,
   wherein the anode composition is defined in any one of claims 1, and 2 through 7.

9. A lithium secondary battery, comprising:
   an anode;
   a cathode; and
   a separator interposed between the anode and the cathode,
   wherein the anode is defined in claim 8.

* * * * *